J. A. NORTON.
TROLLEY HARP.
APPLICATION FILED DEC. 4, 1909.
1,000,034.
Patented Aug. 8, 1911.
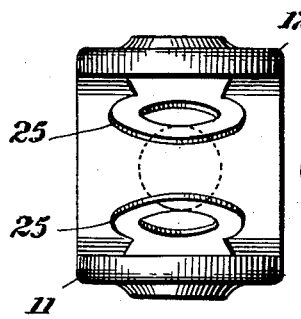
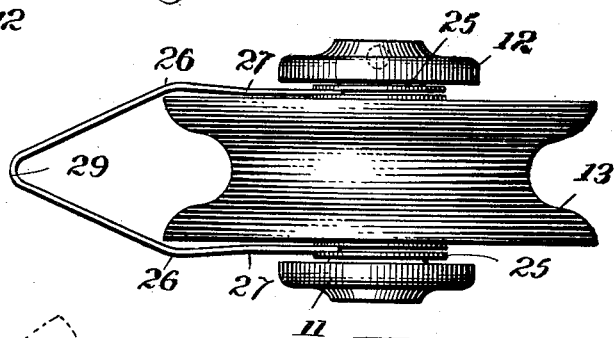
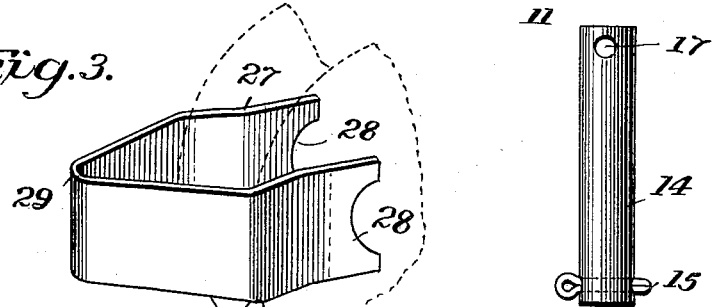
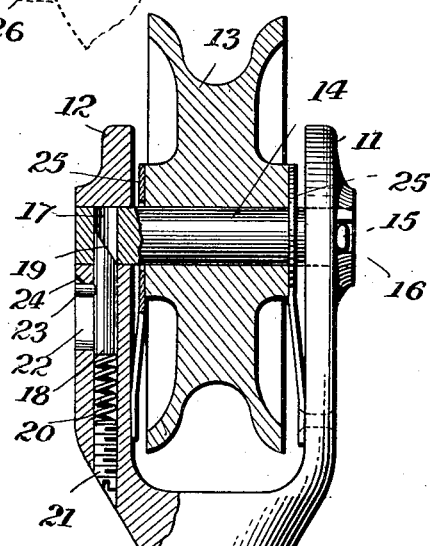
Witnesses
J. G. Hinkel
J. H. Bruninga
Inventor
James A. Norton
By Foster Freeman Watson & Coit
Attorneys

UNITED STATES PATENT OFFICE.

JAMES A. NORTON, OF WILKES-BARRE, PENNSYLVANIA, ASSIGNOR OF ONE-HALF TO WILLIAM L. RAEDER, OF WILKES-BARRE, PENNSYLVANIA.

TROLLEY-HARP.

1,000,034.      Specification of Letters Patent.      Patented Aug. 8, 1911.

Application filed December 4, 1909. Serial No. 531,400.

*To all whom it may concern:*

Be it known that I, JAMES A. NORTON, a citizen of the United States, and resident of Wilkes-Barre, county of Luzerne, State of Pennsylvania, have invented certain new and useful Improvements in Trolley-Harps, of which the following is a specification.

This invention relates to trolley harps.

In trolley harps of common construction in which the wheel is mounted in a fork, and electrical contact between the wheel and fork is obtained by means of resilient strips secured to the inside of the fork and yieldingly engaging the wheel hubs, difficulty has been experienced in assembling the fork and wheel since the strips project inwardly and must be spread apart so that the wheel may be moved in place.

One of the objects of this invention, therefore, is to provide suitable means whereby the difficulties are overcome and the parts may be easily and quickly assembled.

Another object is to provide a novel latch for latching the wheel shaft in position in its bearings.

The invention will be described in connection with the accompanying drawings, in which, Figure 1 is a plan view of the trolley harp showing the wheel in place; Fig. 2 is a vertical section through the trolley harp and wheel; Fig. 3 is a perspective view of the sled, the wheel being shown in dotted position; Fig. 4 is a plan view of the trolley harp with the wheel removed.

Referring to the drawings, 10 designates a harp comprising arms 11 and 12. A trolley wheel is mounted upon a shaft 14 which is positioned in bearings in the arms. A cotter pin 15 extends through one end of the shaft and engages a recess 16 in the arm 11, while the other end of the shaft is provided with a recess or aperture 17 engaged by a latch 18 which is provided with a beveled face 19. The latch is mounted in a guideway in the arm 12 and normally pressed upwardly in locking engagement with the recess 17 by means of a spring 20. The bottom of the guideway is closed by a removable plug 21 which is provided with a slot adapted to be engaged by a screw driver or the like when it is desired to turn the plug, either for the purpose of increasing the tension of the spring or removing the plug. The arm 12 is provided with a slot 22 in which rides a pin 23 connected to the latch, the upper part of the slot being beveled, as shown at 24, so that the pin may be engaged by the finger or a tool.

The operation of the latch will be obvious. After the wheel is in place the shaft is inserted through the bearings in the arm and in the wheel and rides over the inclined end of the latch, the latch snapping back in place so as to securely lock the shaft in position. The engagement between the cotter pin 15 and the recesss 16 will always properly locate the recess in the shaft with respect to the latch. The guideway in the arm 12 for the latch is preferably formed by boring, the bottom of the guideway being closed by the plug 21 which is removable so that the latch may be removed by first removing the pin 23. The pin 23 does not project outside of the arm 12. In this way the outside of the arm is left entirely smooth so that no part will catch on the trolley wire.

Electrical contact is made between the fork and the trolley wheel by means of resilient contact pieces or strips 25 secured to the inside of the fork and bearing yieldingly against the hubs of the trolley wheel. In referring to Fig. 4, it will be noticed that when the trolley wheel is removed these resilient pieces will project inwardly so that they will nearly touch. It is very difficult to position the wheel between these strips since the wheel must be worked in place and the strips must be spread apart while this is done. This invention provides means whereby the trolley wheel may be easily and quickly inserted in position between the strips. A substantially V-shaped spreader 26 tapers nearly to a point 29, the arms 27 being provided with recesses 28 which clear the hole in the trolley wheel. When it is desired to place the wheel in position, the spreader is placed on the wheel, as shown in Fig. 3 and also in Fig. 1. The spreader is of resilient material so that when the arms are spread apart to place the sled on the wheel, they will hug the wheel and the sled will thus be firmly secured in place. The wheel can now be moved in position between the strips 25, by inserting the point 29 between the strips and moving the wheel and spreader forward. (From right, Fig. 1, to left, Fig. 4.) The spreader will spread apart the strips and will thus guide the wheel in place to the position shown in Fig. 1. The shaft can now be inserted, the recesses 28 permitting it to clear the sled, and the spreader can be removed.

In the particular embodiment shown, the spreader is detachable. It may however be permanently secured to the wheel in such a manner that the wheel may rotate freely relatively to it. The spreader may further be U-shaped or of any other tapered construction. It is further obvious that various changes may be made in the details of construction without departing from this invention and it is therefore to be understood that this invention is not to be limited to the specific construction shown and described.

Having thus described the invention what I claim is:

1. In a trolley harp, the combination with a frame having arms and bearings in said arms, of a trolley wheel shaft mounted in said bearings and provided with a recess, one of said arms having a guide-way therein communicating with one of said bearings, and a beveled latch in said guide-way and projecting into the bearing in said arms to be engaged by the end of said shaft and said recess.

2. In a trolley harp, the combination with a frame having arms and bearings in said arms, of a trolley wheel shaft mounted in said bearings and provided with a recess, one of said arms being provided with a guideway and a slot, a beveled latch bolt in said guideway, and a pin attached to the latch bolt and working in said slot.

3. In a trolley harp, the combination with a frame having arms and bearings in said arms, of a trolley wheel shaft mounted in said bearings and provided with a recess, one of said arms being provided with a bored guideway, a beveled latch bolt in said guideway, a spring in said guideway bearing on the bolt and an adjustable plug in the bottom of said guideway for the purpose described.

4. In a trolley harp, the combination with a frame having arms and bearings in said arms, of a trolley wheel shaft mounted in said bearings and provided with a recess, one of said arms being provided with a bored guideway, a beveled latch bolt in said guideway, a plug for the bottom of said guideway, a spring in said guideway between said plug and bolt, said arm being provided with a slot, and a pin attached to said latch and working in said slot.

5. In a trolley harp, the combination with a frame having arms and bearings in said arms, of a trolley wheel shaft mounted in said bearings and provided with a recess, one of said arms being provided with a bored guideway, a beveled latch bolt in said guideway, a plug for the bottom of said guideway, a spring in said guideway between said plug and bolt, said arm being provided with a slot, and a pin attached to said latch and working in said slot, the exterior surface of said arm being smooth and having no projecting parts.

In testimony whereof I affix my signature in presence of two witnesses.

JAMES A. NORTON.

Witnesses:
CARL LARSON,
K. E. FERRY.